United States Patent [19]
Blasi et al.

[11] Patent Number: 5,176,968
[45] Date of Patent: Jan. 5, 1993

[54] ELECTROCHEMICAL CELL

[75] Inventors: Jane A. Blasi, Acton; Richard M. Mank, Weymouth; Rowland A. Griffin, Bedford, all of Mass.

[73] Assignee: Duracell Inc., Bethel, Conn.

[21] Appl. No.: 634,918

[22] Filed: Dec. 27, 1990

[51] Int. Cl.⁵ .................. H01M 26/16; H01M 2/18
[52] U.S. Cl. ..................................... 429/194; 429/94; 429/145; 429/249; 429/254
[58] Field of Search ............... 429/254, 249, 145, 194, 429/94

[56] References Cited

U.S. PATENT DOCUMENTS

| | | | |
|---|---|---|---|
| 4,086,401 | 4/1978 | Sundberg et al. | 429/145 |
| 4,137,379 | 1/1979 | Schmidt et al. | 429/254 |
| 4,184,012 | 1/1980 | Barrella | 429/249 |
| 4,741,979 | 5/1988 | Faust et al. | 429/249 |
| 4,794,057 | 12/1988 | Griffin | 429/254 |

Primary Examiner—Mark L. Bell
Assistant Examiner—C. Melissa Bonner
Attorney, Agent, or Firm—Ronald S. Cornell; James B. McVeigh, Jr.

[57] ABSTRACT

The invention relates to a non-aqueous electrochemical cell having spirally wound electrodes and a separator having a basis weight of at least 20 g/m² and comprising melt blown non-woven polypropylene fibers.

5 Claims, No Drawings

ELECTROCHEMICAL CELL

The present invention relates to a lithium/manganese dioxide electrochemical cell employing spirally wound electrodes having improved safety and performance characteristics. The improvements are the result of employing a two ply non-woven polypropylene material as the separator between the electrodes.

Non-woven separators have in the past been limited in use because their thickness can lead to a high electrolyte resistance between the electrodes which can detrimentally affect high rate capability. They have been used in cells having aqueous electrolytes because these electrolytes have very high conductivities which offsets the increased resistance of a thick separator. Non-woven separators have also been used in low rate button cells since the resistance of the devices powered by these cells is substantially greater than the resistance of a thick separator so that the separator resistance becomes negligible. They have also been used in very high rate lithium systems, such as lithium/sulfur dioxide, because such cells have a high rate capability due to a fluid active material, $SO_2$, which overcomes the higher resistance of the non-woven separator.

Cells employing lithium anodes and manganese dioxide cathodes spirally wound together are widely available throughout the world and are preferred for many for applications where high energy densities are required. However, the current carrying capability of these cells is often restricted by the organic electrolytes used because these electrolytes have low conductivities as compared to aqueous systems. As a result it has been the practice to minimize the distance (and therefore the electrolyte resistance) between the anode and cathode by using thin, microporous separators. For example, commercially available $Li/MnO_2$ cells have in the past comprised microporus films of either high density polyethylene or polypropylene having a thickness of about 0.001 inch (1 mil). A drawback to using such thin separators is that under certain mechanical abuse conditions the electrodes have a tendency to break through the separator causing a direct internal short circuit. Such short circuits can lead to undesirable heating of the cell resulting in venting or other detrimental conditions. Nonetheless, microporous films remain widely used because competition in the marketplace demands maximum performance from these cells. Any separator other than a thin microporous film must not impair cell performance to any significant degree or the manufacturer is at a competitive disadvantage.

One approach to remedy the problems caused by cell heating due to short circuits has been to include as a component of the separator a material which melts at a low temperature thereby reducing the current carrying capability of the separator. Various embodiments of this approach are described in U.S. Pat. Nos. 4,741,979, 4,075,400, and 4,731,304. Each of these approaches involves the modification of either a microporous or non-woven substrate for incorporation of the heat sensitive material. These modifications not only add to the complexity of making the separator but they also add cost of the final product.

The present invention is based on the discovery that a separator comprising at least two plies of a non-woven polypropylene material provides improved safety during abuse conditions without having to incorporate additional low melting materials in the separator. It was unexpectedly discovered that such a separator is capable of reducing current flow during a short circuit well below the melting point of the material. While the thicker separators used in the present invention require that one or both electrodes be slightly thinner than when microporous films are used, there is virtually no performance penalty beyond that expected from using slightly less active material. This is quite unexpected since the greater distance between the electrodes would be predicted to adversely impact cell performance, particularly at high rate. An additional benefit of the present invention is that non-woven materials are a fraction of the cost of microporous films.

Generally, the present invention relates to an electrochemical cell having an alkali metal anode, a solid active cathode, and a non-aqueous electrolyte wherein the anode and cathode are spirally wound together with the separator therebetween. The separator comprises a porous fabric made from melt blown non-woven polyolefin, and most preferably polypropylene, fibers. Preferably the separator is a laminate of two plies of the porous fabric. The separator preferably further comprises a reaction barrier such as the type generally described in U.S. Pat. No. 4,184,012, the disclosure of which is incorporated herein by reference.

Two plies are preferred over a single ply having the same thickness, porosity, and basis weight for the following reason. The melt blow process for making non-woven fabrics comprises randomly laying fibers down on a substrate. This random process can occasionally create an area in the fabric where there are relatively few fibers s that a hole is in effect created. This hole can lead to direct short circuits between the anode and cathode in a cell during abuse conditions such as voltage reversal. During voltage reversal the cathode becomes plated with anode material, often in the form of dendrites. In areas where there is a hole in the separator the plating process is enhanced and it is likely that a dendrite will grow through the hole, contact the anode, and internally short circuit the cell. However, by superimposing two plies over each other any holes in one ply are covered by non-woven fibers in the other ply so that the hole is effectively blocked off. If is highly unlikely that two holes, one in each ply, would exactly superimpose.

The laminated separator should have an overall thickness of between about 1.5 and 6 mils and more preferably between 2 and 3 mils. A thickness below 1.5 mils is not practical because non-woven fabrics are difficult to prepare that thin and because it is likely that the protection against short circuits during voltage reversal would be detrimentally affected since non-woven fabrics are highly porous. Thicknesses above 6 mils are undesirable because they occupy too much space inside the cell, space which is preferably occupied by active materials, and because the resistivity between the electrodes would be high enough to impact o high rate performance.

The individual plies used to prepare the laminate are made using a melt blown process. Each ply is generally thicker than one half of the thickness of the final laminate. The two plies are overlaid and passed between heated calendar rollers to laminate the plies together and reduce the thickness down to the desired thickness.

It is preferred that the laminate is made from non-woven polypropylene fibers. Polypropylene has a melting point of around 160° C. Separators made from microporous films generally are not capable of reducing current and stopping cell heating until the shorted cell reaches 140°-150° C. It has unexpectedly been discovered that the non-woven separator of the present invention maintains the cell temperature below 140° C.

Non-woven materials are generally very porous and it is important that they are not so porous that short circuits can easily occur through the open structure. On the other hand, it is desirable that the porosity is high enough so that sufficient electrolyte can occupy the void spaces to minimize concentration polarization during high rate discharge. It has been discovered that a basis weight (i.e. the weight per unit area) of preferably at least 20 $g/m^2$ and more preferably at least 25 $g/m^2$ provides a porosity which does not impinge on high rate performance but provides the requisite protection during voltage reversal. Generally, these values translate to a porosity of at least 33%, and more preferably at least 45%. The basis weight is directly related to the thickness of the final laminate. Thus, for a laminate having a final thickness between 2.5 and 3 mils the basis weight should be between 25 and 35 $g/m^2$ whereas a laminate having a final thickness of about 4 mils would have a basis weight of at least about 35 $g/m^2$.

As mentioned above it is desirable to include a reaction barrier in the separator. In a spirally wound cell there is a layer of separator against both surfaces of the anode and cathode. It is only necessary to include the reaction barrier in one of the two separator layers. This is achieved as follows. A strip of separator longer than the anode is provided with a reaction barrier lengthwise down its center. The anode strip is laid on top of the separator with its leading edge set back from the leading edge of the separator. A second piece of separator without a reaction barrier, about the same length as the first piece, is laid on top of the anode and being aligned with the first piece of separator. The cathode strip is laid on top of the second piece of separator with its leading edge set back from the leading edge of the separator. The electrodes are spirally wound on a mandrel by first taking the leading edges of the separator and then winding the electrodes and separator until a cylindrical spirally wound electrode package is obtained. Thus, in accordance with the present invention, in a most preferred embodiment, there is a reaction barrier provided in the separator adjacent to at least one surface of each electrode. Alternatively, a reaction barrier could be provided in each separator layer.

The advantages of the present invention are clearly evident in the following examples. All parts are parts by weight unless otherwise indicated.

COMPARATIVE EXAMPLE A

Ten ⅔A size lithium/manganese dioxide cells are made by spirally winding the electrodes together with a 1.5 mil thick microporous polypropylene separator (K256 Celgard® made by Hoescht-Celanese Corp.) therebetween. The lithium anode is 7 mils thick, 0.9 inch wide, and 8 and ¾ inches long. The manganese dioxide cathode is 16 mils thick, 1.1 inches wide, and 9 and ¼ inches long. The spirally wound electrodes are inserted in a cylindrical metal casing and the cell is filled with an electrolyte comprising 0.65M $LiClO_4$ in a 2:3 mixture (by volume) of propylene carbonate and dioxolane. The anode is connected to the via a nickel tab which has one end folded under the wound electrodes an welded to the casing bottom. The other end of the tab is cold welded to the anode. A piece of insulative tape covers the tab where it is folded under the electrodes except where it is welded to the casing. A cell cover is crimped in place which mechanically contacts an exposed edge of the cathode.

The ten cells are used to conduct five short circuit tests as described below. Two cells are connected in series and short circuited by connecting a external wire between the positive terminal of one cell and the negative terminal of the other cell. One cell goes into voltage reversal before the other cell and the voltage reversed cell casing gets hotter than the non-voltage reversed cell. Five two-cell short circuit tests are conducted and the average maximum temperature of the reversed cell is 140° C., presumably due to the inside temperature being close to the melting point of polypropylene whereby the melted separator reduces the current flowing through the cell.

EXAMPLE 1

Ten ⅔A size lithium/manganese dioxide cells are prepared as described above except that a separator is used in accordance with the present invention and the cathode is 15 mils thick in order to accommodate the thicker separator. The separator is a two ply non-woven polypropylene laminate (made by Web Dynamics and designated DW902) having a thickness of 2.3 mils, a basis weight of about 27 $g/m^2$, and a porosity of about 55% by volume.

Five short circuit tests are conducted using the ten cells to prepare five two-cell batteries as described above. The average casing temperature of the reversed cell in each test is 127° C. Thus, cells made having a separator in accordance with the present invention are safer because they do not get as hot as prior art cells during short circuit abuse.

The above described examples demonstrate the benefits of the present invention during an external short circuit. It has been discovered that cells made in accordance with the present invention are also safer in situations where an internal short circuit occurs. An internal short circuit generally occurs when a cell is abused by some physical means which deforms the cell casing causing the electrodes to come into direct contact or causing the anode tab to come into contact with the cathode.

EXAMPLES 2-7

Cells built having the same electrode dimensions and separator as Example 1 but having an electrolyte of 0.5M $LiCF_3SO_3$ in a 3:7 mixture of propylene carbonate: dioxolane are discharged under a variety of conditions a described in the left hand column of Table I below. Table I compares the performance of the prior art cells (Comparative Example A type having the electrolyte specified above) and cells made in accordance with this invention. Table I also presents "normalized" prior art cell results which are obtained by taking into account the reduced electrode thickness of cells made in accordance with the present invention. Since cells made with the thicker separator have cathodes that are 1 mil thinner they have 6.25% less active material. Therefore, to more accurately compare the performance of the two separators the prior art cell results are multiplied by 0.9375 as an approximation of how the prior art cells would perform if they had thinner cathodes. These results appear in the third column.

TABLE I

| EXAMPLE NO. and DISCHARGE TEST | Prior Art | This Invention | Normalized Prior Art |
|---|---|---|---|
| 2) 1.2 Amp pulses, 3 sec on, 7 sec off, to 1.7 V cutoff, at −20° C. | 184 pulses | 330 pulses | 172 pulses |
| 3) 1.2 Amp pulses, 3 sec on, 7 sec off, to 1.7 V cutoff, at room temp. | 1040 pulses | 1009 pulses | 975 pulses |
| 4) 0.9 Amp pulses, 3 sec on, 27 sec off, to 1.2 V cutoff, at −20° C. | 1200 pulses | 1037 pulses | 1125 pulses |
| 5) 0.9 Amp pulses, 3 sec on, 27 sec off, to 1.55 V cutoff, at room temp. | 1656 pulses | 1552 pulses | 1552 pulses |
| 6) 8 ohm discharge at 0° C. to 2 V cutoff | 3.08 hours | 2.91 hours | 2.88 hours |
| 7) 100 ohm discharge at room temp. to 2 V cutoff | 52 hours | 45 hours | 48 hours |

EXAMPLES 8–13

Cells are built in accordance with Examples 2–7 but further comprise a 0.1 inch wide reaction barrier down the length of the separator. The cells are divided into six groups and discharged under tests identical to Examples 2–7. Results similar to those given in Table I are obtained.

The above results clearly demonstrate that there is no performance penalty due to using the thicker non-woven separator other than that which can be attributed to less active material. Examples 3–7 all show that the thicker non-woven separator performs about the same as the thinner microporous separator. Quite unexpectedly, however, the non-woven separator surpasses the microporous separator under the discharge condition of Example 2. It is not fully understood why this occurs but it appears that the more open structure of the non-woven separator permits more pulses at higher voltages than the less porous microporous film.

While the above examples relate to lithium/manganese dioxide cells the present invention would be useful in other non-aqueous cells. Non-limiting examples of cathodes include $CF_x$, $V_2O_5$, $WO_3$, $MoO_3$, $MoS_2$, lead oxides, cobalt oxides, copper oxides, CuS, $CuS_2$, $In_2O_3$, iron sulfides, NiS, $Ag_2CrO_4$, $Ag_3PO_4$, $TiS_2$, transition metal polysulfides, and mixtures thereof. Suitable anode materials other than lithium include alkali and alkaline earth metals such as sodium, potassium, calcium, and magnesium as well as aluminum and alloys thereof.

The above examples are for illustrative purposes only. Variations can be made and still remain within the scope of the invention as claimed.

What is claimed is:

1. A non-aqueous electrochemical cell comprising an alkali metal anode, comprising lithium foil a solid active cathode, comprising manganese dioxide and a separator therebetween wherein said anode, cathode and separator are spirally wound together; wherein said separator is a laminate of two plies of a porous non-woven fabric of polypropylene fibers, said separator having a basis weight of at least 20 g/m² and a thickness of between about 1.5 and 6 mils, wherein said separator is capable of reducing current flow in the cell at a temperature below the melting point of the polyolefin.

2. The cell of claim 1 wherein said separator has a porosity of at least 45% by volume.

3. The cell of claim 1 wherein said separator has a thickness of between about 2 and 3 mils.

4. The cell of claim 1 wherein said separator has a weight basis of between about 25 and 30 g/m².

5. The cell of claim 1 wherein the separator adjacent to at least one side of said anode and cathode has a reaction barrier formed substantially down its length.

* * * * *